Figure 1:
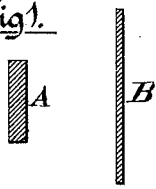

(No Model.)

L. GATHMANN.
METHOD OF MAKING TUBES.

No. 389,144. Patented Sept. 4, 1888.

Witnesses.
Wm. T. Henning.
Louis M. J. Whitehead.

Inventor.
Louis Gathmann.
by Dayton Poole & Brown,
Attorneys.

N. PETERS, Photo-Lithographer, Washington, D. C.

UNITED STATES PATENT OFFICE.

LOUIS GATHMANN, OF CHICAGO, ILLINOIS.

METHOD OF MAKING TUBES.

SPECIFICATION forming part of Letters Patent No. 389,144, dated September 4, 1888.

Application filed May 7, 1888. Serial No. 273,033. (No model.) Patented in England June 25, 1888, No. 9,262; in Germany June 28, 1888, No. 5,712; in France June 29, 1888, No. 178,503; in Belgium June 29, 1888, No. 61,384; in Austria-Hungary June 30, 1888, and in Luxemburg July 10, 1888, No. 1,010.

*To all whom it may concern:*

Be it known that I, LOUIS GATHMANN, of Chicago, in the county of Cook and State of Illinois, have invented certain new and useful Improvements in Methods of Forming Tubes from Coiled Metal Strips, (patented in foreign countries as follows: In Great Britain, No. 9,262, dated June 25, 1888; in France, No. 178,503, dated June 29, 1888; in Germany, No. 5,712, dated June 28, 1888; in Austria-Hungary dated June 30, 1888; in Belgium, No. 61,384, dated June 29, 1888; and in Luxemburg, No. 1,010, dated July 10, 1888;) and I do hereby declare that the following is a full, clear, and exact description thereof, reference being had to the accompanying drawings, and to the letters of reference marked thereon which form a part of this specification.

This invention relates to an improved method of forming tubes of considerable length—such, for example, as gun-barrels, cannon, &c.—from spirally-coiled plates. I have found in the attempted construction of such tubes of considerable length from a continuous spiral coil reduced to a proper thinness to secure an effective distribution of the grain in the curved direction of the coil that the welding of the contiguous surfaces of the laminæ of the coil at a distance from the end or ends of the tube is not readily effected by any blow or pressure which it is practicable to apply. I have therefore devised the improved method of forming such tubes, herein set forth.

My said improved method consists in first forming short coils or those containing few laminæ or leaves and welding each of these separately, thus forming a thick slug as an intermediate product, and thereafter heating and welding two, three, or other small number of these slugs together to form longer slugs or short tubes, and finally adding other slugs thereto by welding until a tube of the required length is built up. In this manner the weld is made perfect between all the adjacent laminæ or layers of the coil and between the adjacent slugs, so that the entire tube, when completed, no matter what its length, will have perfect union between all its original elements and will be of equal strength longitudinally at all points.
In the accompanying drawings I have illustrated the metal strip in its original condition as a bar; its sectional form after its reduction to a thin and relatively broad straight plate; an open or unwelded short spiral coil formed by curving the straight plate edgewise; the disk formed by welding the short spiral or coiled strip; a larger slug formed by the welding of several smaller ones; and, lastly, a tube of considerable length formed by welding numerous slugs together, one after another.

Figures 2, 3:
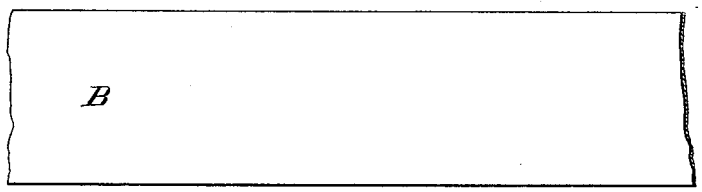
Figure 4:
Figure 5:
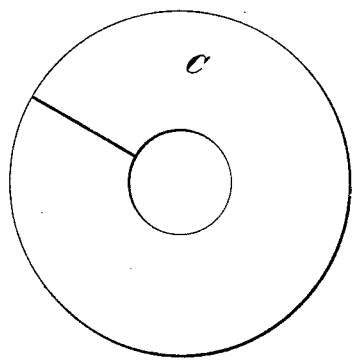
Figure 9:
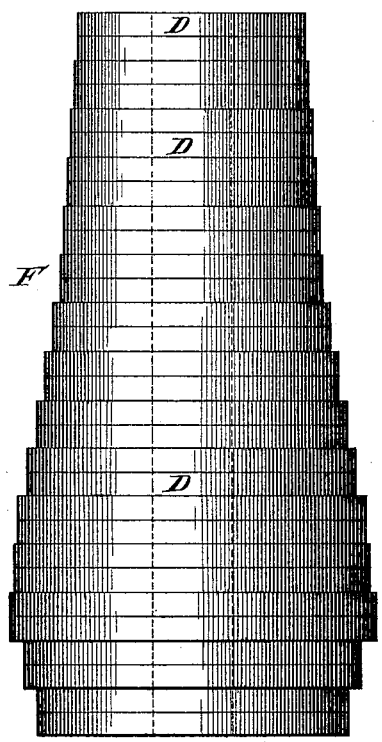
Figure 6:
Figure 7:
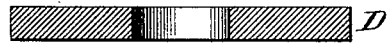
Figure 8:
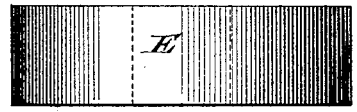

Figure 1 represents, in transverse section, a bar of wrought iron or steel from which a spiral is to be made. Fig. 2 is a transverse section of a strip formed by rolling or drawing the original bar shown in Fig. 1 to greater breadth and less thickness. Fig. 3 is a side view of the rolled or drawn strip shown in section in Fig. 2. Fig. 4 is a side view of a short coil formed from the strip shown in Figs. 2 and 3. Fig. 5 is a top or end view of the short coil shown in Fig. 4. Fig. 6 is a side view of a slug formed by welding together the contiguous leaves or laminæ of the short coil of Fig. 4. Fig. 7 is a central section of the slug shown in Fig. 5. Fig. 8 is a larger slug or short section of tubing formed by welding together a plurality of the slugs shown in Figs. 5 and 6. Fig. 9 is a longer tube formed by welding together a series of slugs like those shown in Figs. 6 and 7, but of unequal diameter externally, as will be done in the construction of a cannon by the method herein set forth.

A is the original bar of metal.

B is the straight, flat, and thin strip formed by rolling or drawing down the bar A.

C is a short spiral coil formed from the strip B.

D is a slug formed by welding together the laminæ of the short coil C.

E is a larger slug or short tube formed by welding together several slugs, D, and F is a tube of considerable length, here shown as of proper length to form a cannon, and also shown as having been formed of slugs of unequal diameter.

The object had in view in making tubes of coiled strips is to secure an arrangement of the "grain" or fiber of the metal in a transverse direction around the axis of the tube, so that the latter is adapted to resist great bursting-strain. To produce a reliable product, however, it is necessary that a perfect welding shall be effected between all the contiguous surfaces of the coil throughout the whole length of the tube. I have found that this result cannot be attained by end blows or pressure in an attempt to unite a great many laminæ or the leaves of a long coil at one time, so as to make a tube of considerable length—as, for example, one long enough to form a gun-barrel or cannon. First, in heating a coil of considerable length and constituted of thin leaves, some portion of the coil will be too highly heated, while another portion or portions may be not hot enough to properly weld; and, secondly, an end blow or pressure will not communicate its force to all points in the tube and leaves intermediate to the ends of the coil will not be perfectly welded. I have therefore been led to make the present invention, which, as hereinbefore stated, consists in first forming short sections of coil each preferably embracing, say, about ten leaves of about one-fourth of an inch in thickness, or, say, twenty leaves one-eighth of an inch thick each, and then heating this short coil to the proper welding condition and welding its leaves together, so as to produce a thorough organic union thereof. This gives an apertured solid disk or slug, (illustrated at D in Figs. 6 and 7.) Having in this manner made such a number of the slugs D as will, when welded together face to face, produce a tube of the required length, as, for example, a cannon, (which is illustrated partly made in Fig. 9,) the slugs are heated and placed one upon another, preferably to the number of two only in the first instance, and these are welded together by proper blows or force applied in the usual manner of welding pieces of metal of corresponding dimensions.

In placing the slugs together in position to be welded care is taken to bring the holes in the slugs into coincidence with each other, which may be done by the preliminary introduction of a short metal bar of suitable diameter. To the two or three slugs thus united another is separately welded, or possibly two or other limited number of slugs may be added to the pile as a single weld, depending upon the thickness of the slugs. In this manner a tube of any desired length is built up, and when finished there is perfect organic union between all of its original parts, and the tube will have uniform longitudinal strength throughout its entire length.

In the construction of cannon or other tubes which require to be of greater diameter at one point in their length than at another slugs D of unequal diameter may be first formed, as described, and these welded together to form a tube of the external contour required, as illustrated in Fig. 9.

The purpose of making tubes of coiled strips being to secure the distribution of the fibers lengthwise of the strips and in a circular course about the axis of the tube, and the most complete lengthwise arrangement of the fibers being accomplished by repeated rollings or drawings of the metal forming the strips, it is manifest that the thinner the strips or leaves of the coils are made from an original bar of given dimensions the greater will be the resisting power of the finished tube to bursting-strain; but the thinner the leaves the greater the number of joints and the greater the liability to defective union of the leaves. By the method of first forming slugs of short coils and then uniting the slugs, as herein set forth, perfect union can be made between the leaves, no matter how thin they may be; and it is therefore practicable by this method to make coiled tubes of greater strength than have heretofore been known.

A tube made from a spiral coil is not of my invention.

In another application—to wit, Serial No. 249,882—filed by me on September 16, 1887, I have described a machine by which relatively flat and broad strips of metal may be bent edgewise to form coils of the peculiar construction herein set forth. Coils curved edgewise may also be formed by rolling between parallel rollers bars of metal which are tapering in cross-section or thicker at one edge than the other.

I claim as my invention.

1. The method of constructing metal tubes from coiled strips or plates, which method consists in first forming short coils from flat metal strips bent edgewise and having their broad surfaces contiguous, then welding these broad surfaces of each coil together to form separate slugs, and then successively welding the slugs together to build up a tube of the required length.

2. The method of constructing metal tubes of great lateral and longitudinal strength, which method consists in first reducing a metal bar to a strip of extreme relative thinness and breadth by repeated drawings or rollings, then forming separate coils from such thin strips in which the broad surfaces of the leaves are contiguous, then welding together the broad surfaces of each coil to form separate slugs or disks, and finally successively welding the slugs together to form a tube of the desired length.

In testimony that I claim the foregoing as my invention I affix my signature in presence of two witnesses.

LOUIS GATHMANN.

Witnesses:
M. E. DAYTON,
TAYLOR E. BROWN.